United States Patent [19]

Katayama et al.

[11] Patent Number: 4,955,799
[45] Date of Patent: Sep. 11, 1990

[54] METAL MOLD CENTERING AND CLAMPING DEVICE IN A TIRE VULCANIZING MACHINE

[75] Inventors: Hideaki Katayama; Toshifumi Murakami, both of Nagasaki; Koji Soeda, Kobe; Yoshiya Kubota; Shoji Okamoto, both of Toyota; Akinori Kubota, Kobe; Michihito Kobayashi, Toyota; Masaaki Ijiri, Aichi; Susumu Ozawa, Hekinan; Kiyoshi Tomosada, Toyota, all of Japan

[73] Assignees: Mitsubishi Jukogyo Kabushiki Kaisha, Tokyo; Sumitomo Rubber Industries, Ltd., Hyogo, both of Japan

[21] Appl. No.: 433,775

[22] Filed: Nov. 9, 1989

[30] Foreign Application Priority Data

Nov. 11, 1988 [JP] Japan .................. 63-283801

[51] Int. Cl.⁵ .............................................. B29G 33/00
[52] U.S. Cl. .................................................... 425/47
[58] Field of Search .................. 425/31, 32, 34.1, 35, 425/47

[56] References Cited

U.S. PATENT DOCUMENTS 3,464,090  9/1969  Cantarutti .................. 425/47
3,833,323  9/1974  Dasch ........................ 425/47
4,043,725  8/1977  Schmidt ..................... 425/34.1
4,828,471  5/1989  Schlautmann .............. 425/32

FOREIGN PATENT DOCUMENTS 2529901  2/1977  Fed. Rep. of Germany ........ 425/47
3444688  6/1986  Fed. Rep. of Germany ........ 425/47
1197207  9/1986  Japan ......................... 425/47

Primary Examiner—Willard Hoag
Attorney, Agent, or Firm—Wenderoth, Lind & Ponack

[57] ABSTRACT

A metal mold centering and clamping device in a tire vulcanizing machine has hydraulic cylinders each having a piston rod equipped with a non-directional bearing at its top portion. The cylinders are mounted on a vulcanizing machine frame close to an outer circumference of a metal mold. An outside portion of a centering member is connected to the vulcanizing machine frame via parallel links to form a parallel linkage, and a bottom portion of the same centering member is connected to the piston rod via a link. On the inside of the centering member and on the outer circumference of a lower metal mold are respectively formed centering surfaces opposed to each other. In addition, at an upper portion of the inside surface of the centering member is formed a clamp claw adapted to be engaged with the edge of the lower metal mold.

4 Claims, 11 Drawing Sheets

METAL MOLD CENTERING AND CLAMPING DEVICE IN A TIRE VULCANIZING MACHINE

BACKGROUND OF THE INVENTION:

1. Field of the Invention:

The present invention relates to a device for automatically performing centering of a metal mold carried in a vulcanizing machine as well as a clamping work for a lower metal mold upon exchange of metal molds when a size and a kind of a tire to be vulcanized are changed in a tire vulcanizing machine.

2. Description of the Prior Art:

In a tire vulcanizing machine, metal molds for vulcanization respectively have different configurations for respective kinds and respective sizes of tires and depending upon a tire production schedule, it is necessary to perform exchange works for metal molds fairly frequently.

An upper metal mold and a lower metal mold were fixed to an upper heat plate and a lower heat plate, respectively, by fastening bolts in the prior art. Since the metal mold exchange work in such a tire vulcanizing machine of the prior art necessitates a long period of time, in recent years plans for improvements thereof have been proposed. One of the proposals is the invention disclosed in Japanese Patent Application No. 60-037704 (1985), and this invention will be described with reference to FIGS. 8 to 12.

In FIGS. 8 to 12, with regard to a metal mold mount portion within a tire vulcanizing machine, in relation to a lower metal mold, on a vulcanizing machine frame 1 a thermal insulator 2 and a lower heat plate 3 are fixedly fastened to the frame by means of bolts 4.

In relation to an upper metal mold, preliminarily a thermal insulator 6 and an upper heat plate 7 are fixedly fastened integrally to a lower surface of a bolster plate 5 by means of bolts 8. The bolster plate 5 is exactly raised and lowered within a frame by means of an elevator and guide means not shown.

Clamp rod 9 is preliminarily assembled as penetrating through holes in the bolster plate 5, the thermal insulator 6 and the upper heat plate 7. At the bottom end of the clamp rod 9 is formed a clamp claw 10, and its top end is fitted to a rotating lever 13 via a key 14. At the middle of a shaft of the clamp rod 9 is mounted a sprocket 11 via a key 12. Furthermore, on the middle portion of the clamp rod 9 is formed a male screw 15, and this male screw 15 is threadedly engaged with a nut 16 which is fixed to the bolster plate 5 by means of bolts 30. Bearings 17 and 18 support the clamp rod 9.

The clamp rods 9 are assembled at four locations at equal intervals on the plane of the bolster plate 5, the respective sprockets 11 are interlocked via a roller chain 19, and thereby rotational drive for the clamp rods 9 is simultaneously transmitted to the clamp rods 9 at four locations.

A sprocket 20 is an idler sprocket for preventing the roller chain 19 from loosening.

Actuation of a cylinder 21 rotationally drives the clamp rod 9 via the lever 13 and the key 14.

A clamp metal 22, a link 23, a lever 24 and a cylinder 25 are used for clamping a lower metal mold 26 and a lower heat plate 3.

A clamp assistant plate 28 is preliminarily fastened to a top surface of an upper metal mold 27 by means of bolts 29, and thus the upper metal mold 27 and the clamp assistant plate 28 are carried into a vulcanizing machine in an integrated state.

When a metal mold is carried into a vulcanizing machine, at first the bolster plate 5, the thermal insulator 6 and the upper heat plate 7 are integrally raised up to the upper limit to broaden a carry-in space for the metal mold, and then, the upper and lower metal molds 26 and 27 and the clamp assistant plate 28 are made to sit at a regular position in the vulcanizing machine 3 by means of a conveying instrument such as a fork-lift or the like. Next, the bolster plate 5 is lowered to bring the upper heat plate 7 into tight contact with the clamp assistant plate 28. At this moment, the clamp claw 10 must be accommodated in the bore of the clamp assistant plate 28 at the position shown in FIG. 11. Then, by actuating the cylinder 25, the clamp metal 22 is meshed with a slot 31 in the lower metal mold 26, and thereby the lower heat plate and the slot 31 are clamped.

Subsequently, the cylinder 21 is actuated to rotate the clamp rod 9, hence the clamp claw 10 is rotated by about 90° as shown in FIG. 12, and the upper heat plate 7 and the clamp assistant plate 28 are clamped. When the clamp rod 9 rotates, the clamp rod is raised by the screw 15, and the upper heat plate 7 and the clamp assistant plate 28 are firmly held in tight contact.

In the above-described device in the prior art, centering means for performing a centering work after the upper and lower metal molds to be exchanged have been carried into the vulcanizing machine, is not provided, and a centering work for the metal mold is carried out by manual operations, so that the centering work necessitates a long period of time and is dangerous.

SUMMARY OF THE INVENTION:

It is therefore one object of the present invention to provide an improved metal mold centering and clamping device in a vulcanizing machine, which is free from the above-described shortcomings of the metal mold centering and clamping device in the prior art, which can quickly and easily carry out a centering work of a metal mold and a clamping work for a lower metal mold upon exchange of metal molds.

According to one feature of the present invention, there is provided a metal mold centering device in a tire vulcanizing machine, comprising a plurality of hydraulic cylinders each having a piston rod equipped with a non-directional bearing at its top portion and erected on a vulcanizing machine frame close to an outer circumference of a metal mold, a centering member having its outside portion connected to the vulcanizing machine frame via a parallel linkage and having its bottom portion connected to the aforementioned piston rod via a link, and centering surfaces formed on the inside surface of the centering member and the outer circumferential surface of a lower metal mold, respectively, as opposed to each other.

In other words, according to the feature of the present invention, hydraulic cylinders having a piston rod equipped with a non-directional bearing at its top portion, are erected on a vulcanizing machine frame close to an outer circumference of a metal mold. An outside portion of a centering member is connected to the vulcanizing machine frame via a parallel linkage, and a bottom portion of the same centering member is connected to the piston rod via a link. On the inside surface of the centering member and on the outer circumferential surface of a lower metal mold are respectively formed centering surfaces opposed to each other. In addition, at an upper portion of the inside surface of the centering member is formed a clamp claw adapted to be engaged with the edge of the lower metal mold.

In operation, when upper and lower metal molds are placed on the piston rod equipped with a non-directional bearing, the piston rod would descend due to the gravity of the upper and lower metal molds, hence the centering member connected to the same piston rod via a link would be moved towards the center of the vulcanizing machine by the movement of the parallel linkage, thus the member pushes the side surface of the metal mold and performs centering. Accordingly, at the time point when the metal mold has sit on the surface of the lower heat plate, the centering work for the metal mold would be finished automatically.

In addition, under this condition as the clamp claw provided in the centering member strikes against the edge of the lower metal mold, if pressurized fluid for clamping is fed to the hydraulic cylinder, clamping of the metal mold can be achieved.

Thus, according to the present invention, a centering work upon exchange of metal molds can be effected automatically without necessitating a manual operation at all, and so, a metal mold exchange work can be performed very efficiently. Moreover, clamping of a lower metal mold after finishment of centering also can be done by one touch through remote control of a switching valve for a hydraulic cylinder, and therefore, the operation is safe and a large extent of energy saving is possible.

The above-mentioned and other objects, features and advantages of the present invention will become more apparent by reference to the following description of one preferred embodiment of the invention taken in conjunction with the accompanying drawings.

Figure 7:
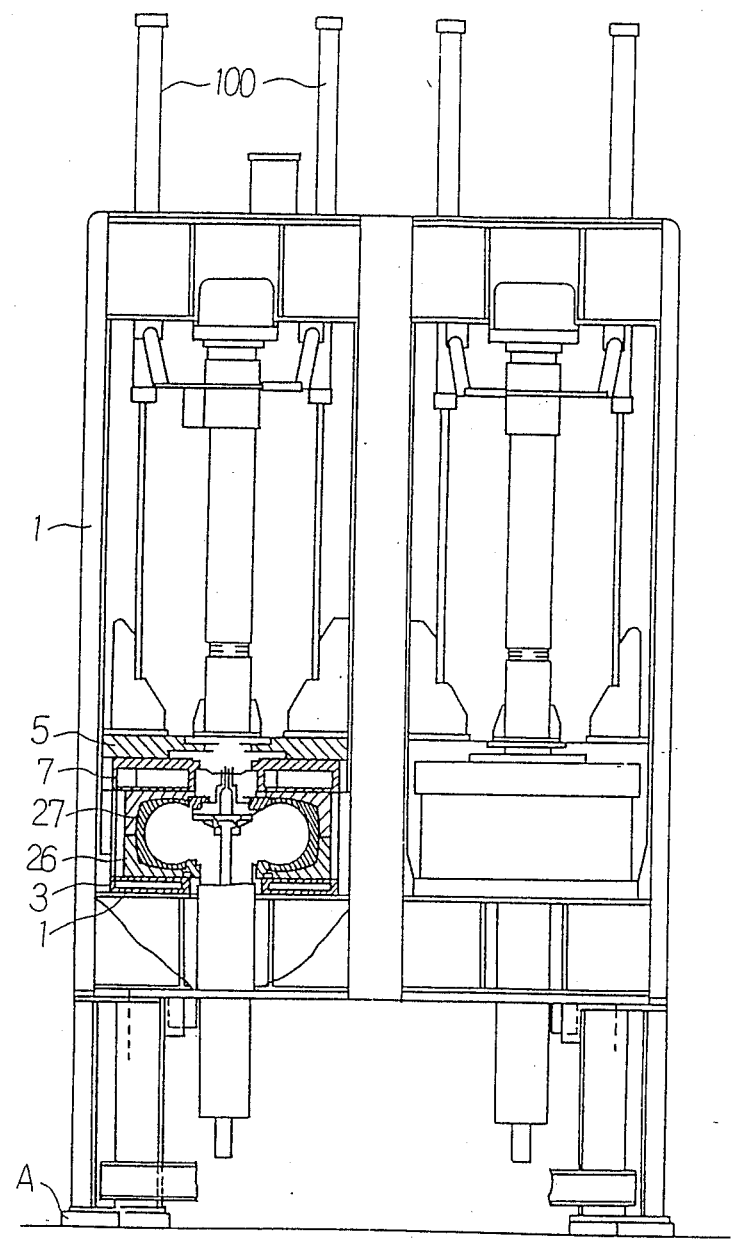
FIG. 7 is a general front view of a tire vulcanizing machine.

DESCRIPTION OF THE PREFERRED EMBODIMENT:

Referring now to FIG. 7 which shows a general construction of a tire vulcanizing machine, on installation bases A is installed a double-based frame 1, and in this frame are disposed two sets of vulcanizing apparatuses of the same shape. The vulcanizing apparatus includes upper and lower metal molds 26 and 27, the lower metal mold 26 is mounted to the frame 1 via a lower heat plate 3, and the upper metal mold 27 is mounted to a bolster plate 5 via an upper heat plate 7. It is to be noted that the bolster plate 5 is connected to elevator cylinders 100, so that the upper metal mold can be retreated upwards before and after a tire vulcanizing work.

In the following, one preferred embodiment of the present invention will be explained with reference to FIGS. 1 to 6.

In these figures, reference numeral 50 designate support plates extended from the frame, which are provided at three locations along the circumference of the lower metal mold 26. Reference numeral 51 designates a hydraulic cylinder fixed to the lower surface of the same support plate 50 at an approximately vertical attitude, and its piston rod 52 extends upwards as penetrating through the support plate 50.

Reference numeral 53 designates a non-directional bearing of spherical shape provided on a bracket 54 at the tip end of the piston rod 52, and this bearing 53 forms a metal mold support member jointly with the above-described hydraulic cylinder 51.

Reference numeral 55 designates a bracket vertically fixed to the aforementioned support plate 50, a centering member 57 is connected to this bracket 55 via two parallel links 56, and the bottom end of the centering member 57 is connected to the bracket 54 of the piston rod 52 via a link 58. Reference numerals 59, 60, 61 and 62 designate pins for pivotably coupling the links 56 and 58, respectively, to the centering member 57 and the bracket 54. In addition, on the inside surface (the surface opposed to the lower metal mold 26) of the centering member 57 are formed a centering surface 63 having a V-shaped horizontal cross-section and a lower clamp claw 64 for fixing the lower metal mold.

Reference numeral 65 designates a centering surface having a V-shaped horizontal cross-section, which is formed on the outer circumferential surface of the lower metal mold 26 as opposed to the centering member 57.

Figure 2:
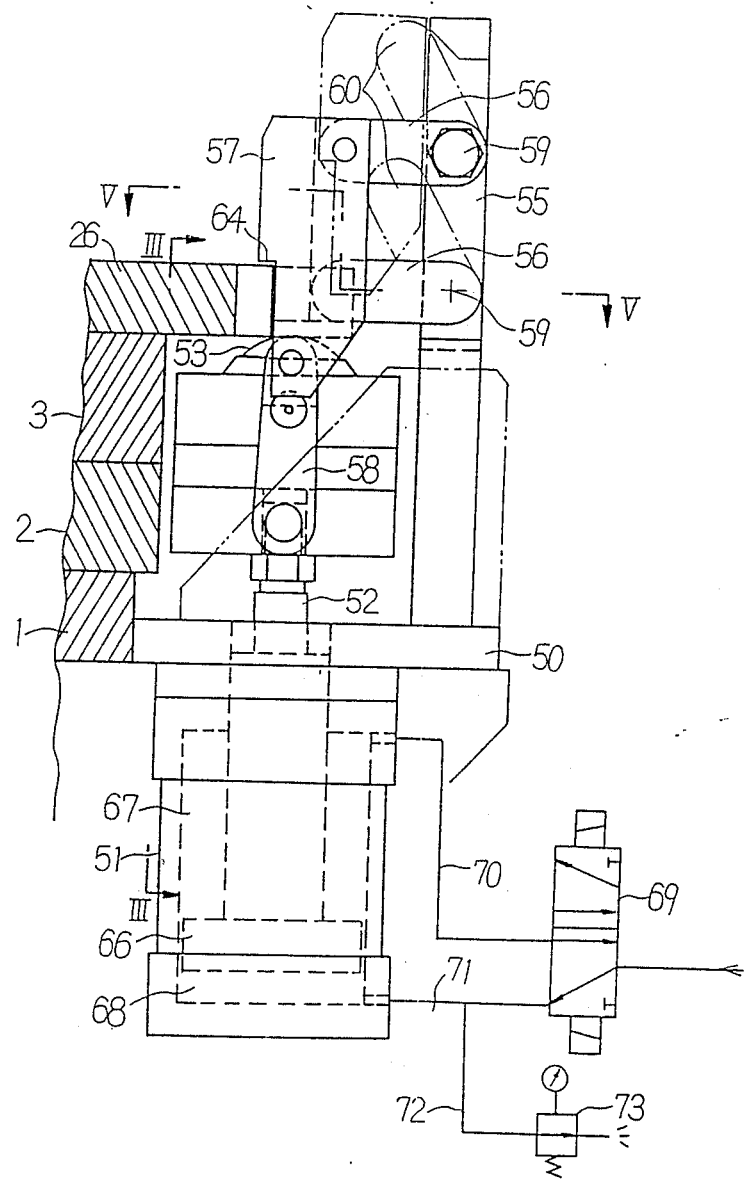

As shown in FIG. 2, the hydraulic cylinder 51 is partitioned by a piston 66 into upper and lower pressure chambers 67 and 68, and pressurized fluid feed/exhaust lines 70 and 71 are connected to these pressure chambers via a switching valve 69. Reference numeral 72 designates an exhaust line branched from the pressurized fluid line 71 between the lower pressure chamber 68 and the switching valve 69, a relief valve 73 is provided in this branched line, and pressurized fluid having a pressure higher than a predetermined pressure is exhausted to the outside of the cylinder through this relief valve 73.

Figure 1:
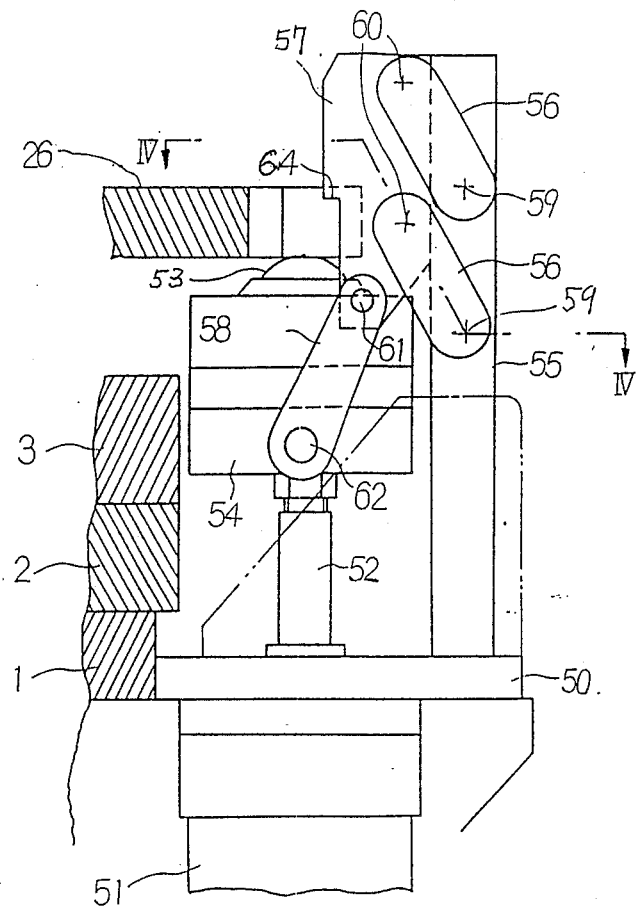
FIGS. 1 and 2 are side views of an essential part of a metal mold centering and clamping device in a tire vulcanizing machine according to one preferred embodiment of the present invention, FIG. 1 showing the state of commencing centering for a metal mold carried into a tire vulcanizing machine, FIG. 2 showing the state of finishment of centering for the metal mold shown in FIG. 1.

In the above-described device, upon exchange of metal molds, if a new metal mold (upper and lower metal molds forms a set of metal mold) is placed on the non-directional bearing 53 of the metal mold support member by any conveying means such as a fork-lift or the like as shown in FIG. 1, then due to the gravity of the metal mold, the pressure in the lower pressure chamber 68 of the hydraulic cylinder 51 rises higher than a predetermined value, and so, the pressurized fluid is exhausted through the relief valve 73. Consequently, the support member and the support members therefor (the bearing 53, the bracket 54 and the piston rod 52) would descend. At this moment, the centering member 57 connected to the piston rod 52 via the link 58 is pulled downwards, and also it performs parallel translation towards the center of the vulcanizing machine by rotation of the parallel links 56 about the fulcrum pins 59 and 60, and thus pushes the metal mold on the bearing 53 towards the center of the vulcanizing machine. In addition, at the final stage of the operation, the centering surface 63 provided on the inside surface of the centering member 57 and having a V-shaped cross-section fits to the centering surface 65 provided on the side of the metal mold, and thereby centering in the circumferential direction of the metal mold is also effected (the state shown in FIG. 2). Under this condition, if pressurized fluid for clamping is fed to the upper pressure chamber 67 by manipulating the switching valve 69, then the lower metal mold 26 is fixedly pressed onto the surface of the lower heat plate 3 by means of the clamp claw 64.

Figure 6:
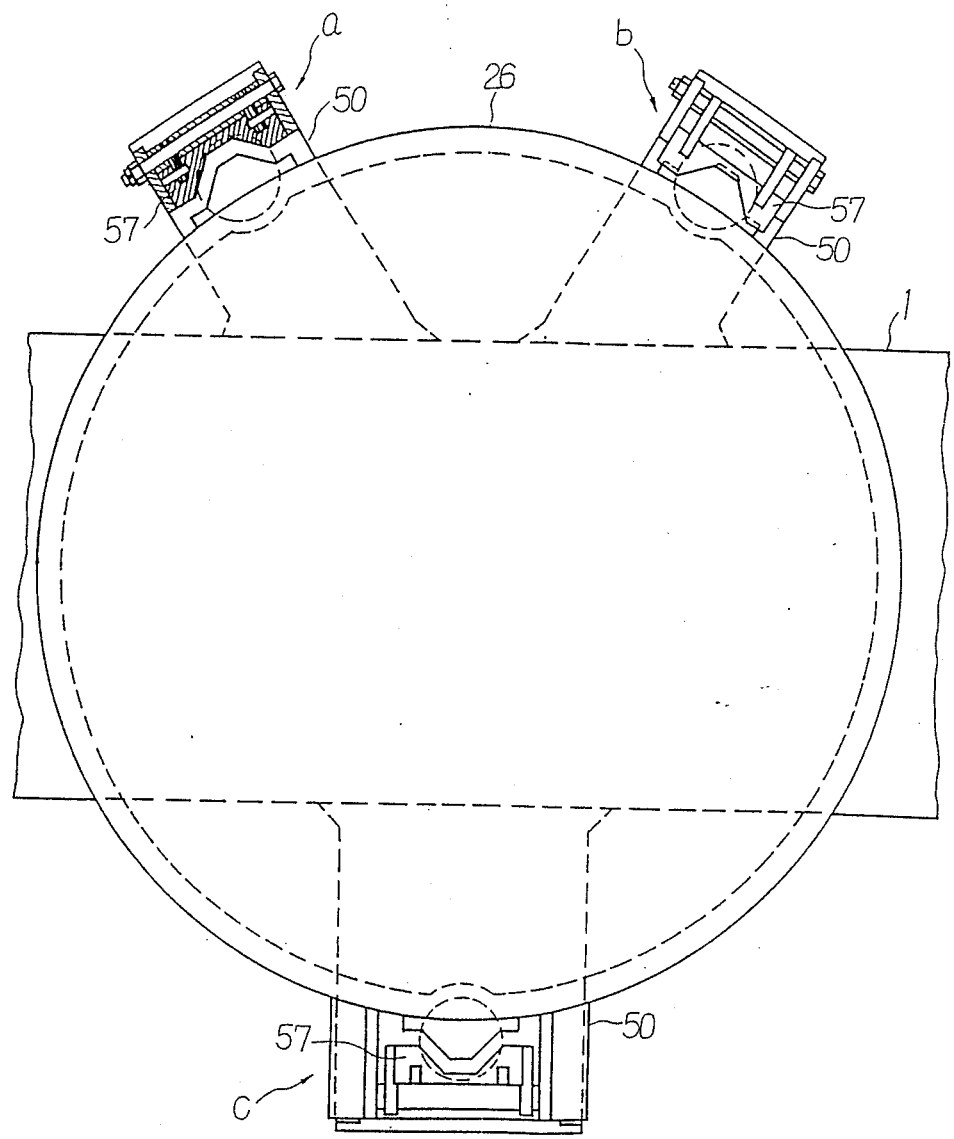
FIG. 6 is a plan view of a metal mold and a centering and clamping device shown in FIGS. 1 and 2.

In FIG. 6, the devices shown at a and c are illustrated under the condition where the centering member 57 is at the raised position (FIG. 1), while the device shown at b is illustrated under the condition where the centering member is at the lowered position (FIG. 2).

As will be seen from the detailed description of the preferred embodiment above, according to the present invention, owing to the fact that the subject device is provided with a plurality of hydraulic cylinders each having a piston rod equipped with a non-directional bearing at its top portion and erected on a vulcanizing machine frame close to an outer circumference of a metal mold, a centering member having its outside portion connected to the vulcanizing machine frame via a parallel linkage and having its bottom portion connected to the piston rod via a link, centering surfaces formed on the inside surface of the centering member and the outer circumferential surface of a lower metal mold, respectively, as opposed to each other, and a clamp claw formed at the upper portion of the inside surface of the centering member and adapted to be engaged with the edge of the lower metal mold, the following advantages are obtained:

(1) Since a centering work upon exchange of metal molds can be effected automatically without necessitating a manual operation at all, a metal mold exchange work can be performed very efficiently; and (2) Since clamping of a lower metal mold after centering also can be done by one touch through remote control of a switching valve for a hydraulic cylinder, the clamping work is safe, and a large extent of energy saving is possible.

Since many changes and modifications can be made to the above-described construction without departing from the spirit of the present invention, it is intended that all matter contained in the above description and illustrated in the accompanying drawings shall be interpreted to be illustrative and not in a limiting sense.

What is claimed is:

1. In a tire vulcanizing machine having a vulcanizing machine frame and a metal tire mold formed of upper and lower metal molds supportable on the frame, a metal mold centering device for centering the mold in the machine, said device comprising: a plurality of hydraulic cylinders each having a piston rod equipped with a non-directional bearing at its top portion, said cylinders mounted on the vulcanizing machine frame close to an outer circumference of the metal mold, when the mold is supported on the frame; and a centering member connected, at a radially outer portion thereof, to the vulcanizing machine frame via parallel links and at a bottom portion thereof to said piston rod via a link; said centering member* defining a centering surface at a radially inner portion thereof and the lower metal mold defining a centering surface at the outer circumference thereof, said centering surfaces opposed to each other so as to be engageable with one another to effect centering of the mold when the lower metal mold is disposed on said nondirectional bearing and said piston rod is lowered.

2. A metal mold centering device in a tire vulcanizing machine as claimed in claim 1, which further comprises a clamp claw formed at an upper part of the radially inner portion of the centering member and adapted to engage the lower metal mold at an edge thereof, and a clamping pressure feed line leading to the hydraulic cylinder.

3. A metal mold centering and clamping device in a tire vulcanizing machine as claimed in claim 1 wherein a relief valve is provided in an exhaust line communicated with a pressure chamber in the hydraulic cylinder for supporting a metal mold.

4. A metal mold centering and clamping device in a tire vulcanizing machine as claimed in claim 2, wherein a relief valve is provided in an exhaust line communicated with a pressure chamber in the hydraulic cylinder for supporting a metal mold.

* * * * *

UNITED STATES PATENT AND TRADEMARK OFFICE
CERTIFICATE OF CORRECTION

PATENT NO. : 4,955,799

DATED : September 11, 1990

INVENTOR(S) : Hideaki KATAYAMA et al.

It is certified that error appears in the above-identified patent and that said Letters Patent is hereby corrected as shown below:

Columns 1-6, line 15:
The specification has been replaced by the following:

-- METAL MOLD CENTERING AND CLAMPING
DEVICE IN A TIRE VULCANIZING MACHINE

BACKGROUND OF THE INVENTION

Field of the Invention:

The present invention relates to a device for automatically centering a metal mold supported in a vulcanizing machine and clamping a lower metal mold upon the exchange of metal molds when the size and type of tire to be vulcanized are to be changed in a tire vulcanizing machine.

Description of the Prior Art:

In a tire vulcanizing machine, metal molds for vulcanization have different configurations for respective kinds and sizes of tires and depending upon a tire production schedule, it is necessary to exchange the metal molds fairly frequently.

An upper metal mold and a lower metal mold were fixed to an upper heat plate and a lower heat plate, respectively, by fastening bolts in the prior art. Since the metal mold exchange work in such a tire vulcanizing machine of the prior art necessitates a long period of time, in recent years plans for improvements thereof have been proposed. One of the proposals is the invention disclosed in Japanese Patent Application No. 60-037704 (1985), and this invention will be described with reference to Figs. 8 to 12.

UNITED STATES PATENT AND TRADEMARK OFFICE
CERTIFICATE OF CORRECTION

PATENT NO. : 4,955,799
DATED : September 11, 1990
INVENTOR(S) : Hideaki KATAYAMA et al.

It is certified that error appears in the above-identified patent and that said Letters Patent is hereby corrected as shown below:

In Figs. 8 to 12, a metal mold mount portion within a tire vulcanizing machine, includes a thermal insulator 2 and a lower heat plate 3 fixedly fastened to a vulcanizing machine frame 1 by means of bolts 4.

With respect to an upper metal mold, a thermal insulator 6 and an upper heat plate 7 are fixedly fastened integrally to a lower surface of a bolster plate 5 by means of bolts 8. The bolster plate 5 is exactly raised and lowered within a frame by means of an elevator and guide means not shown.

Clamp rod 9 extends through holes in the bolster plate 5, the thermal insulator 6 and the upper heat plate 7. At the bottom end of the clamp rod 9 is formed a clamp claw 10, and its top end is fitted to a rotating lever 13 via a key 14. At the middle of a shaft of the clamp rod 9 is mounted a sprocket 11 via a key 12. Furthermore, on the middle portion of the clamp rod 9 is formed a male screw 15, and this male screw 15 is threadedly engaged with a nut 16 which is fixed to the bolster plate 5 by means of bolts 30. Bearings 17 and 18 support the clamp rod 9.

The clamp rods 9 are disposed at four locations at equal intervals about the bolster plate 5. The respective sprockets 11 are interlocked via a roller chain 19, whereby rotational drive for the clamp rods 9 is simultaneously transmitted to the clamp rods 9 at four locations.

Numeral 20 designates an idler sprocket for preventing the roller chain 19 from loosening.

Actuation of a cylinder 21 rotationally drives the clamp rod 9 via the lever 13 and the key 14.

UNITED STATES PATENT AND TRADEMARK OFFICE
CERTIFICATE OF CORRECTION

PATENT NO. : 4,955,799
DATED : September 11, 1990
INVENTOR(S) : Hideaki KATAYAMA et al.

It is certified that error appears in the above-identified patent and that said Letters Patent is hereby corrected as shown below:

A metal clamp 22, a link 23, a lever 24 and a cylinder 25 are used for clamping a lower metal mold 26 and a lower heat plate 3.

A clamp assistant plate 28 is fastened to a top surface of an upper metal mold 27 by means of bolts 29, and thus the upper metal mold 27 and the clamp assistant plate 28 are mounted in the vulcanizing machine in an integrated state.

When a metal mold is carried into a vulcanizing machine, at first the bolster plate 5, the thermal insulator 6 and the upper heat plate 7 are integrally raised up to an upper limit position to broaden a carry-in space for the metal mold. And then, the upper and lower metal molds 26 and 27 and the clamp assistant plate 28 are set at a regular position in the vulcanizing machine 3 by means of a conveying instrument such as a fork-lift or the like. Next, the bolster plate 5 is lowered to bring the upper heat plate 7 into tight contact with the clamp assistant plate 28. At this moment, the clamp claw 10 must be accommodated in the bore of the clamp assistant plate 28 at the position shown in Fig. 11. Then, by actuating the cylinder 25, the metal clamp 22 is engaged with mold 26 within a slot 31 in the lower metal mold 26, whereby the lower heat plate and the mold 26 are clamped together.

Figure 12:
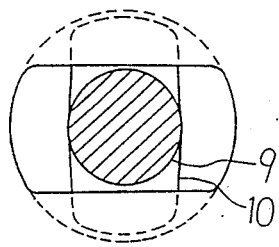
FIG. 12 is a similar cross-section view but showing a state where a clamp rod has been rotated by 90° with respect to the state shown in FIG. 11.

Subsequently, the cylinder 21 is actuated to rotate the clamp rod 9. Hence, the clamp claw 10 is rotated by about 90° as shown in Fig. 12, and the upper heat plate 7 and the clamp assistant plate 28 are clamped together. When the clamp rod 9 rotates, the clamp rod is raised by the screw 15, and the upper heat plate 7 and the clamp assistant plate 28 are firmly held in tight contact.

UNITED STATES PATENT AND TRADEMARK OFFICE
CERTIFICATE OF CORRECTION

PATENT NO. : 4,955,799

DATED : September 11, 1990

INVENTOR(S) : Hideaki KATAYAMA et al.

It is certified that error appears in the above-identified patent and that said Letters Patent is hereby corrected as shown below:

In the above-described device in the prior art, centering means for performing a centering operation, after the upper and lower metal molds to be exchanged have been carried into the vulcanizing machine, is not performed. Rather a centering operation for the metal mold is carried out manually, which manual centering operation necessitates a long period of time and is dangerous.

SUMMARY OF THE INVENTION

It is therefore one object of the present invention to provide an improved metal mold centering and clamping device in a vulcanizing machine, which is free from the above-described shortcomings of the metal mold centering and clamping device in the prior art, which can quickly and easily carry out the centering of a metal mold and a clamping of a lower metal mold when exchanging metal molds in the machine.

According to one feature of the present invention, there is provided a metal mold centering device in a tire vulcanizing machine, comprising a plurality of hydraulic cylinders each having a piston rod equipped with a non-directional bearing at its top portion and erected on a vulcanizing machine frame close to an outer circumference of a metal mold, a centering member having its outside portion connected to the vulcanizing machine frame via parallel links to form a parallel linkage and having its bottom portion connected to the aforementioned piston rod via a link, and centering surfaces formed on the inside of the centering member and the outer circumference of a lower metal mold, respectively, as opposed to each other.

In other words, according to the present invention, hydraulic cylinders having a piston rod equipped with a non-directional bearing at its top portion are erected on a

UNITED STATES PATENT AND TRADEMARK OFFICE
CERTIFICATE OF CORRECTION

PATENT NO. : 4,955,799
DATED : September 11, 1990
INVENTOR(S) : Hideaki KATAYAMA et al.

It is certified that error appears in the above-identified patent and that said Letters Patent is hereby corrected as shown below:

vulcanizing machine frame close to an outer circumference of a metal mold. An outside portion of a centering member is connected to the vulcanizing machine frame so as to form a parallel linkage, and a bottom portion of the same centering member is connected to the piston rod via a link. On the inside of the centering member and on the outer circumference of a lower metal mold are respectively formed centering surfaces opposed to each other. In addition, at an upper portion of the inside of the centering member is formed a clamp claw adapted to be engaged with the edge of the lower metal mold.

During operation, when upper and lower metal molds are placed on the piston rod equipped with a non-directional bearing, the piston rod descends due to the gravity of the upper and lower metal molds. Hence, the centering member connected to the same piston rod via a link moves toward the center of the vulcanizing machine by the movement of the parallel linkage. Thus, the member pushes the side surface of the metal mold and performs a centering operation. Accordingly, when the metal mold has come to rest on the surface of the lower heat plate, the centering of the metal mold has already been performed automatically.

In addition, under this condition as the clamp claw provided in the centering member strikes against the edge of the lower metal mold, if pressurized fluid for clamping is fed to the hydraulic cylinder, clamping of the metal mold can be achieved.

Thus, according to the present invention, a centering operation upon the exchange of metal molds can be effected automatically without necessitating a manual operation. Therefore, the metal mold exchange operation can be performed very efficiently. Moreover, the clamping of a lower metal mold after the centering operation is completed can be done by one touch through the

UNITED STATES PATENT AND TRADEMARK OFFICE
CERTIFICATE OF CORRECTION

PATENT NO. : 4,955,799

DATED : September 11, 1990

INVENTOR(S) : Hideaki KATAYAMA et al.

It is certified that error appears in the above-identified patent and that said Letters Patent is hereby corrected as shown below:

remote control of a switching valve for a hydraulic cylinder. Therefore, the operation is safe and a large amount of energy savings is possible.

The above-mentioned and other objects, features and advantages of the present invention will become more apparent by referring to the following description of one preferred embodiment of the invention taken in conjunction with the accompanying drawings.

BRIEF DESCRIPTION OF THE DRAWINGS

In the accompanying drawings

Figure 3:
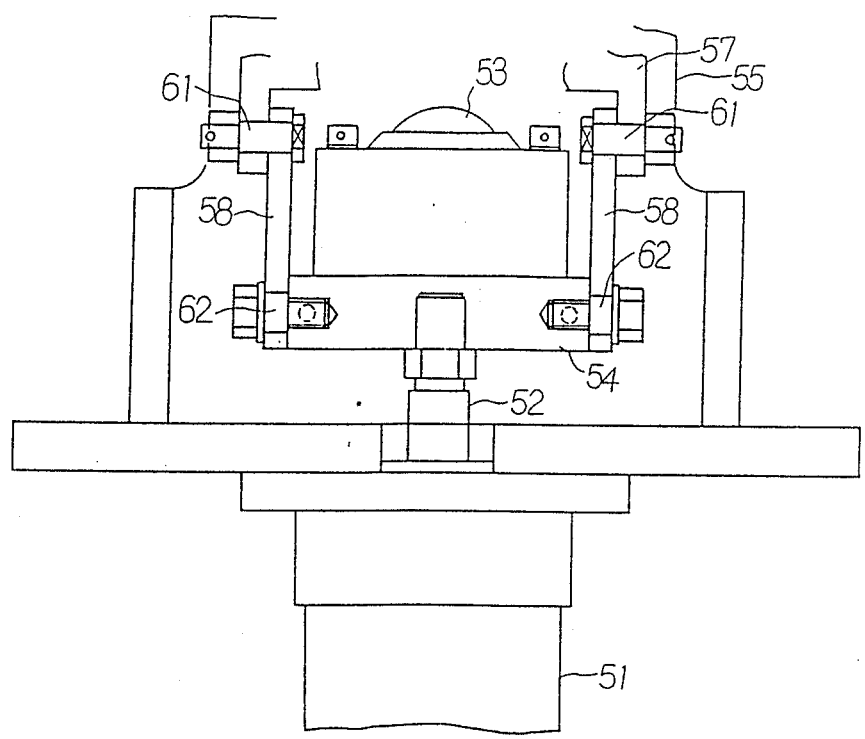
FIG. 3 is a schematic vertical cross-section view taken along line III—III in FIG. 2 as viewed in the direction of arrows.
Figure 4:
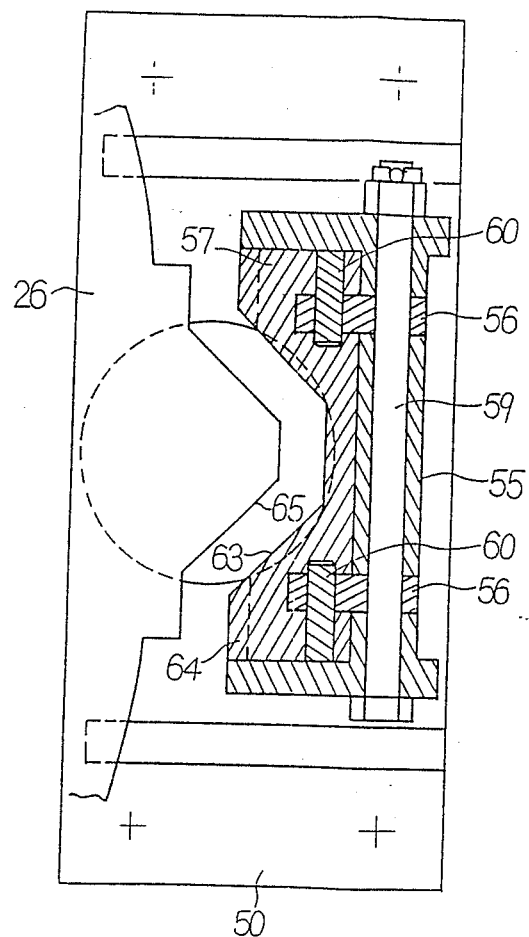
FIG. 4 is a horizontal cross-section view taken along line IV—IV in FIG. 1 as viewed in the direction of arrows.
Figure 5:
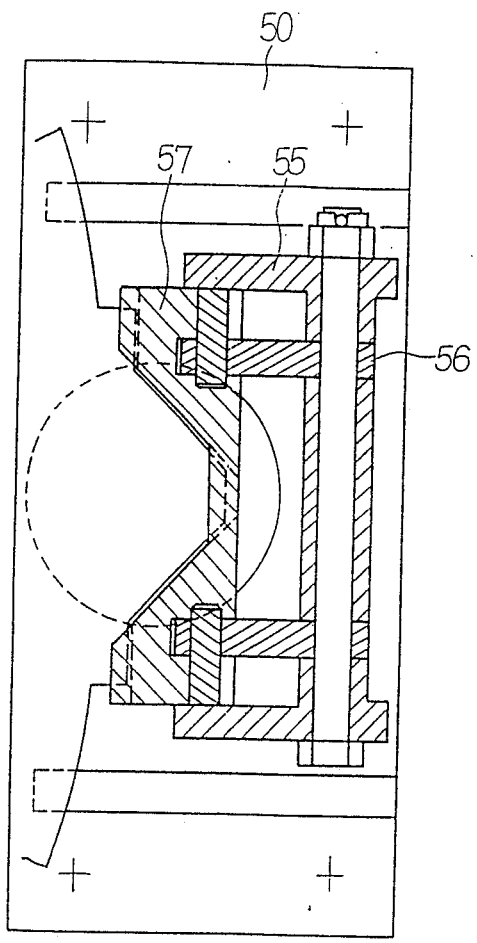
FIG. 5 is a horizontal cross-section view taken along line V—V in FIG. 2 as viewed in the direction of arrows.

Figs. 1 and 2 are side views of an essential part of a metal mold centering and clamping device in a tire vulcanizing machine according to one preferred embodiment of the present invention, Fig. 1 showing the commencement of the centering of a metal mold placed in a tire vulcanizing machine, and Fig. 2 showing the completion of the centering of the metal mold;

Fig. 3 is a schematic vertical cross-sectional view taken along line III-III in Fig. 2;

Fig. 4 is a horizontal cross-sectional view taken along line IV-IV in Fig. 1;

Fig. 5 is a horizontal cross-sectional view taken along line V-V in Fig. 2;

Fig. 6 is a plan view of a metal mold and the centering and clamping device shown in Figs. 1 and 2;

Fig. 7 is a general front view of a tire vulcanizing machine;

UNITED STATES PATENT AND TRADEMARK OFFICE
CERTIFICATE OF CORRECTION

PATENT NO. : 4,955,799

DATED : September 11, 1990

INVENTOR(S) : Hideaki KATAYAMA et al.

Figure 8:
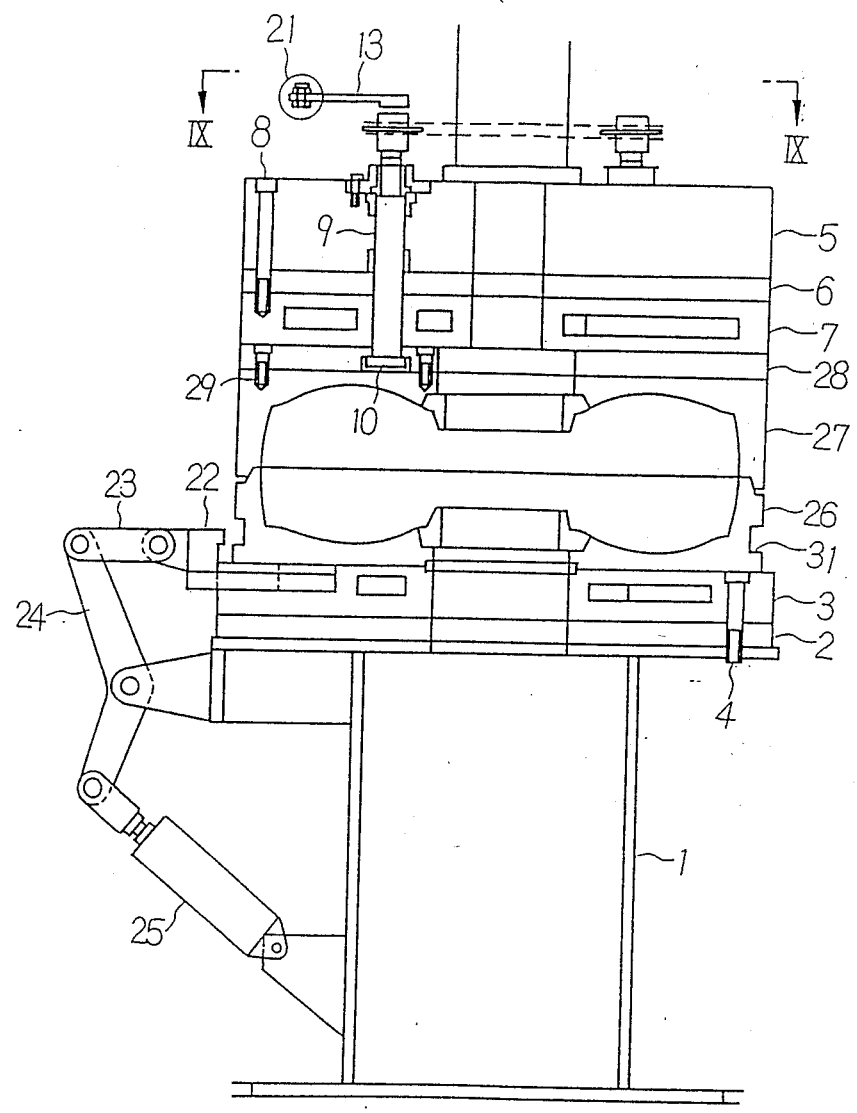
FIG. 8 is a schematic vertical cross-section view showing metal mold clamp means in a tire vulcanizing machine in the prior art.
Figure 9:
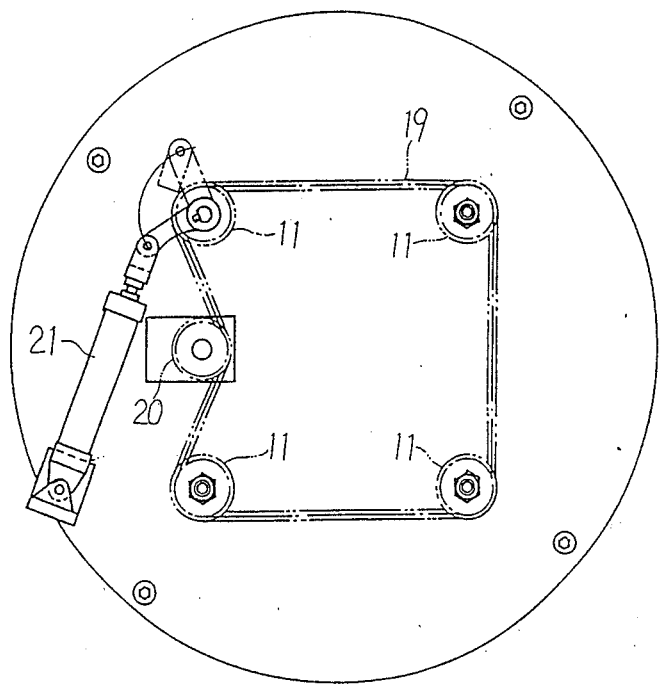
FIG. 9 is a plan view of the same means taken along line IX—IX in FIG. 8 as viewed in the direction of arrows.
Figure 10:
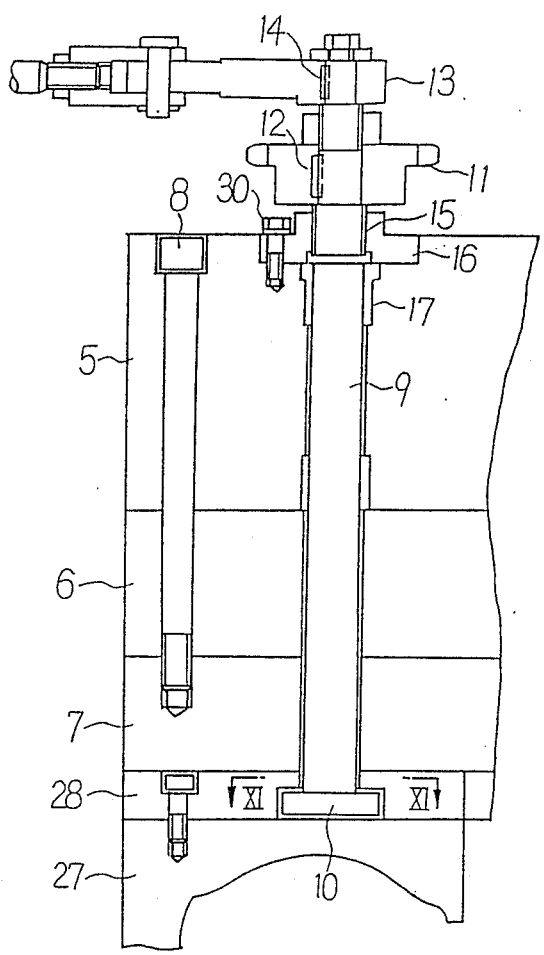
FIG. 10 is a schematic vertical cross-section view of the same means taken along a center axis of a clamp rod.
Figure 11:
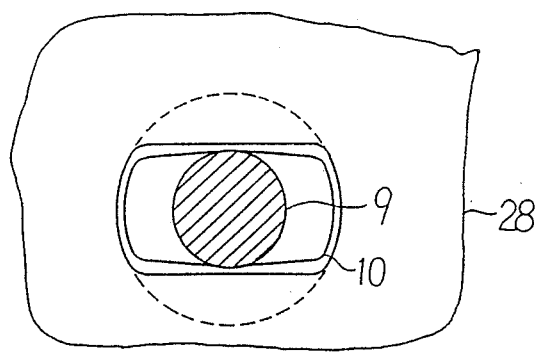
FIG. 11 is a partial horizontal cross-section view taken along line XI—XI in FIG. 10 as viewed in the direction of arrows.

It is certified that error appears in the above-identified patent and that said Letters Patent is hereby corrected as shown below:

Fig. 8 is a schematic vertical cross-sectional view of metal mold clamp means in a tire vulcanizing machine in the prior art;

Fig. 9 is a plan view of the same means taken along line IX-IX in Fig. 8;

Fig. 10 is a schematic vertical cross-sectional view of the same means taken along a center axis of a clamp rod;

Fig. 11 is a partial horizontal cross-sectional view taken along line XI-XI in Fig. 10; and Fig. 12 is a similar cross-sectional view but showing a state in which a clamp rod has been rotated by 90° with respect to the state shown in Fig. 11.

DETAILED DESCRIPTION OF THE PREFERRED EMBODIMENT

Referring now to Fig. 7 which shows the general structure of a tire vulcanizing machine, on installation bases A is installed a double-based frame 1, and in this frame are disposed two sets of vulcanizing apparatuses of the same shape. Each vulcanizing apparatus includes upper and lower metal molds 26 and 27. The lower metal mold 26 is mounted to the frame 1 via a lower heat plate 3, and the upper metal mold 27 is mounted to a bolster plate 5 via an upper heat plate 7. It is to be noted that the bolster plate 5 is connected to elevator cylinders 100, so that the upper metal mold can be retracted upwards before and after a tire vulcanizing operation.

In the following, one preferred embodiment of the present invention will be explained with reference to Figs. 1 to 6.

UNITED STATES PATENT AND TRADEMARK OFFICE
CERTIFICATE OF CORRECTION

PATENT NO. : 4,955,799

DATED : September 11, 1990

INVENTOR(S) : Hideaki KATAYAMA et al.

It is certified that error appears in the above-identified patent and that said Letters Patent is hereby corrected as shown below:

In these figures, reference numeral 50 designates support plates extending from the frame, which are provided at three locations along the circumference of the lower metal mold 26. Reference numeral 51 designates a hydraulic cylinder fixed to the lower surface of the same support plate 50 at an approximately vertical attitude, and its piston rod 52 extends upwards as penetrating through the support plate 50.

Reference numeral 53 designates a non-directional bearing of spherical shape provided on a bracket 54 at the tip end of the piston rod 52, and this bearing 53 forms a metal mold support member jointly with the above-described hydraulic cylinder 51.

Reference numeral 55 designates a bracket vertically fixed to the aformentioned support plate 50. A centering member 57 is connected to this bracket 55 via two parallel links 56, and the bottom end of the centering member 57 is connected to the bracket 54 of the piston rod 52 via a link 58. Reference numerals 59, 60, 61 and 62 designate pins for pivotably coupling the links 56 and 58, respectively, to the centering member 57 and the bracket 54. In addition, on the inside (the side opposed to the lower metal mold 26) of the centering member 57 are formed a centering surface 63 having a V-shaped horizontal cross section and a lower clamp claw 64 for fixing the lower metal mold.

Reference numeral 65 designates a centering surface having a V-shaped horizontal cross section, which is formed on the outer circumference of the lower metal mold 26 as opposed to the hydraulic member 57.

As shown in Fig. 2, the hydraulic cylinder 51 is partitioned by a piston 66 into upper and lower pressure chambers 67 and 68, and pressurized fluid feed/exhaust lines 70 and 71 are connected

UNITED STATES PATENT AND TRADEMARK OFFICE
CERTIFICATE OF CORRECTION

PATENT NO. : 4,955,799

DATED : September 11, 1990

INVENTOR(S) : Hideaki KATAYAMA et al.

It is certified that error appears in the above-identified patent and that said Letters Patent is hereby corrected as shown below:

to these pressure chambers via a switching valve 69. Reference numeral 72 designates an exhaust line branched from the pressurized fluid line 71 between the lower pressure chamber 68 and the switching valve 69. A relief valve 73 is provided in this branched line, and pressurized fluid having a pressure higher than a predetermined pressure is exhausted to the outside of the cylinder through this relief valve 73.

In the above-described device, when exchanging metal molds, when a new metal mold (upper and lower metal molds forming a metal mold set) is placed on the non-directional bearing 53 of the metal mold support member by any conveying means such as a fork-lift or the like as shown in Fig. 1, then due to the gravity of the metal mold, the pressure in the lower pressure chamber 68 of the hydraulic cylinder 51 rises higher than a predetermined value, and therefore causes pressurized fluid to be exhausted through the relief valve 73. Consequently, the support member and the support members therefor (the bearing 53, the bracket 54 and the piston rod 52) descend. At this moment, the centering member 57 connected to the piston rod 52 via the link 58 is pulled downwards, and is translated towards the center of the vulcanizing machine by the rotation of the parallel links 56 about the fulcrum pins 59 and 60. Thus, centering member 57 pushes the metal mold on the bearing 53 towards the center of the vulcanizing machine. In addition, at the final stage of the operation, the centering surface 63 provided on the inside of the centering member 57 and having a V-shaped cross section engages the centering surface 65 provided on the metal mold, whereby centering in the circumferential direction of the metal mold is also effected (the state shown in Fig. 2). Under this condition, if pressurized fluid for clamping is fed to the upper pressure chamber 67 by manipulating the switching valve 69, then the lower metal mold 26 is fixedly pressed onto the surface of the lower heat plate 3 by means of the clamp claw 64.

UNITED STATES PATENT AND TRADEMARK OFFICE
CERTIFICATE OF CORRECTION

PATENT NO. : 4,955,799

DATED : September 11, 1990

INVENTOR(S) : Hideaki KATAYAMA et al.

It is certified that error appears in the above-identified patent and that said Letters Patent is hereby corrected as shown below:

In Fig. 6, the devices shown at $\underline{a}$ and $\underline{c}$ are illustrated under the condition in which the centering member 57 is at the raised position (Fig. 1), while the device shown at $\underline{b}$ is illustrated under the condition in which the centering member is at the lowered position (Fig. 2).

As will be seen from the detailed description of the preferred embodiment above, according to the present invention, owing to the fact that the subject device is provided with a plurality of hydraulic cylinders each having a piston rod equipped with a non-directional bearing at its top portion and erected on a vulcanizing machine frame close to an outer circumference of a metal mold, a centering member having its outside portion connected to the vulcanizing machine frame via a parallel linkage and having its bottom portion connected to the piston rod via a link, centering surfaces formed on the inside of the centering member and the outer circumference of a lower metal mold, respectively, as opposed to each other, and a clamp claw formed at the upper portion of the inside of the centering member and adapted to be engaged with the edge of the lower metal mold, the following advantages are obtained:

(1) since a centering step when exchanging metal molds can be effected automatically without a manual operation, a metal mold exchange operation can be performed very efficiently; and (2) since the clamping of a lower metal mold after centering is carried out by the remote control of a switching valve for a hydraulic cylinder, the clamping work is safe, and a large amount of energy savings is possible.

Since many changes and modifications can be made to the above-described structure without departing from the spirit of

UNITED STATES PATENT AND TRADEMARK OFFICE
CERTIFICATE OF CORRECTION

PATENT NO. : 4,955,799
DATED : September 11, 1990
INVENTOR(S) : Hideaki KATAYAMA et al.

It is certified that error appears in the above-identified patent and that said Letters Patent is hereby corrected as shown below:

the present invention, it is intended that all matter contained in the above description and illustrated in the accompanying drawings shall be interpreted to be illustrative and not limitative of the invention.--

Signed and Sealed this

Second Day of February, 1993

Attest:

STEPHEN G. KUNIN

*Attesting Officer*     Acting Commissioner of Patents and Trademarks